United States Patent [19]

Haferkamp et al.

[11] 4,047,742
[45] Sept. 13, 1977

[54] PIPE CONNECTION FOR COMPENSATION OF THERMAL MOTION

[75] Inventors: Dirk Haferkamp; Alija Hodzic, both of Mannheim; Eike Paetz, Ludwigshafen; Heinrich Stach, Ilvesheim, all of Germany

[73] Assignee: Hochtemperatur-Reaktorbau GmbH, Mannheim, Germany

[21] Appl. No.: 623,345

[22] Filed: Oct. 17, 1975

[30] Foreign Application Priority Data

Oct. 17, 1974 Germany .......................... 2449430

[51] Int. Cl.² ............................................. F16L 55/00
[52] U.S. Cl. ............................... 285/187; 176/40; 176/87; 277/148; 277/149; 285/47; 285/375
[58] Field of Search ............. 285/187, 224, 267, 375, 285/232, 47; 277/148, 149, 150, 154, 152, 195; 176/87

[56] References Cited

U.S. PATENT DOCUMENTS

| 965,355 | 7/1910 | Allen | 277/149 |
|---|---|---|---|
| 1,734,691 | 11/1929 | Randall | 277/148 |
| 1,902,792 | 3/1933 | Warner | 277/148 |
| 2,375,494 | 5/1945 | Ray | 284/187 X |
| 2,550,536 | 4/1951 | Delano, Jr. et al. | 285/267 |
| 2,867,458 | 1/1959 | Kroekel | 277/149 X |
| 3,286,646 | 11/1966 | Peras | 277/148 X |
| 3,451,625 | 6/1969 | Fruktaw | 285/267 X |
| 3,705,734 | 12/1972 | Rajakovics | 285/47 |

FOREIGN PATENT DOCUMENTS

| 193,459 | 11/1906 | Germany | 277/154 |
|---|---|---|---|
| 277,806 | 9/1927 | United Kingdom | 277/148 |
| 675,935 | 7/1952 | United Kingdom | 285/47 |

*Primary Examiner*—Thomas F. Callaghan
*Attorney, Agent, or Firm*—Bacon & Thomas

[57] ABSTRACT

Joints for high temperature and high pressure conduits are disclosed wherein two conduit members are joined in such a manner that permits axial and radial movement due to temperature variations therein while at the same time provides sealing of the joints by means of segmented sealing rings disposed in grooves and extending into a space defined by a sleeve-like extension on one conduit member and a bushing like extension on a second conduit member.

5 Claims, 2 Drawing Figures

PIPE CONNECTION FOR COMPENSATION OF THERMAL MOTION

BACKGROUND OF THE INVENTION

1. Field of the Invention

The present invention relates to conduit joints capable of compensating for thermal motion in high pressure and high temperature impingement pipelines, and more particularly to conduit joint structures having guided sealing rings arranged in annular grooves.

2. Description of the Prior Art

A number of pipe joints or connections are known which are meant to guarantee that a seal is maintained between two pipe ends, even with changes in length of the pipeline members as a result of temperature differences, such that the tightness of the pipeline is not impaired.

German Published Application No. 1,813,260 and the corresponding U.S. Pat. No. 3,549,178 disclose joining pipes which enable the compensation for motion due to thermal variations in the pipeline at right angles, as well as parallel to the intermediate gasket surfaces between the pipe sections. This device is, however, very complicated and expensive to construct and not easy to operate. As opposed to the direct connecting of the pipe sections, a coupling member is provided for. This coupling member is joined to one of the pipe sections by a clamping member and to the other structural member through a support member which supports at the same time a further structural member on the second pipe section. By this further structural member the support member is held in contact with the first structural member. A pressure member is connected further with the coupling member and supports itself on said member.

A further pipe joint is described in German Published Application No. 1,746,249 and the corresponding U.S. Pat. No. 3,713,972 wherein radial and axial movement are coequally permitted by the joint construction. This device consists of two coaxial sleeves of which the inner engages one pipe member through a bayonet coupling and the outer is joined to the sleeve-like, extended other pipe member through a similar connection. Circular grooves carrying rings are arranged between the two coaxial sleeves. The rings seal the sleeves against one another. Each sleeve can slide relative to the part of the pipe with which it is not joined through the bayonet connection and is made tight to this part through the assembly of the sealing rings. These pipe connections require relatively large amounts of space so that it is suggested that the pipeline be narrowed down in the region of the joint. This would, however, provide for unfavorable results in the flow conditions inside the pipeline. A further deficiency of this pipe joint is that the pipeline is not fully sealed.

SUMMARY OF THE INVENTION

From this state of technology, the present invention arises. It is therefore a primary object of the present invention to provide a conduit joint for compensation of axial and radial thermal motion by utilization of sealing rings.

It is another object of this invention to provide a conduit joint which also functions with full, operation safety in high temperature, high pressure pipelines.

It is also an object of this invention to provide a conduit joint which requires only minimum engineering for its construction and permits easy manipulation.

These objects and advantages are achieved according to the present invention by providing a joint for high temperature and high pressure conduits comprising:

a first hollow member extending from a first conduit member and surrounding a second hollow member extending from a second conduit member and defining a space between the first and second hollow members;

a groove in one of the hollow members opening toward the space between the first and second hollow members;

a ring disposed in the groove and extending into the space in sealing relationship to the first and second hollow members, the ring including a plurality of segments separate from and contiguous with each other;

biasing means coupled with the ring for maintaining each ring segment in sealing relationship to the hollow members; whereby the segmented ring compensates for axial and radial motion of said members due to temperature variations therein.

In one embodiment of the present invention the groove is in the first hollow member, which correspondingly acts as a sleeve-like holder for the sealing ring. The groove is an annular groove and may contain preferably two or more segmented sealing rings disposed next to one another. Each segment of the sealing rings is biased against the second hollow member which correspondingly serves as a bushing-like member with the biasing means being preferably a plurality of helical springs coupled radially at the outer circumference of the ring. These springs operate radially inward maintaining each ring segment in sealing relationship to the second hollow member. Each of the springs is disposed, preferably in a separate boring and coupled with one or more ring segments.

It is often advantageous to provide more than one groove in the sleeve-like member and more than one segmented ring in each of the grooves.

The number of sealing rings in a groove, as well as also the number of annular grooves provided in the ring holder, can be chosen as desired; that is the conduit joint, according to the present invention, can be utilized by choosing various numbers of rings in the pipelines with various differing pressures. Because the overall construction of the pipeline is accomplished simply by putting together two pipeline members by connecting the same, the invention provides a simple and easy handling of conduit joints. On the basis of their limited spacial requirements and their high operation safety, the joints of the present invention permit application generally in installation units, especially in gas-cooled high temperature reactors, fast breeders, and thermal process plants.

Preferably, the conduit joints, according to the present invention, provide compensation of axial and radial displacement of the inner pipeline of coaxial gas conduits with which is associated high pressure and temperature differences between the inner and outer pipelines. With conduits of this nature, the inner pipeline is provided usually with an inner thermal isolation and comprises on the outside a pressure housing and on the inside a conduit housing. The pressure housing is expanded on the side of the pipeline junction in a sleeve-like manner and serves as the sealing ring holder, while it is constructed on the other side as a bushing. By means of the helical springs, the segments of sealing rings are pressed tight against the bushing. In the area of the conduit joints, several cushioning elements are provided which are secured to the inner isolation. These elements have the task of absorbing the contraction energies and the reaction energies of the pipeline.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 1:
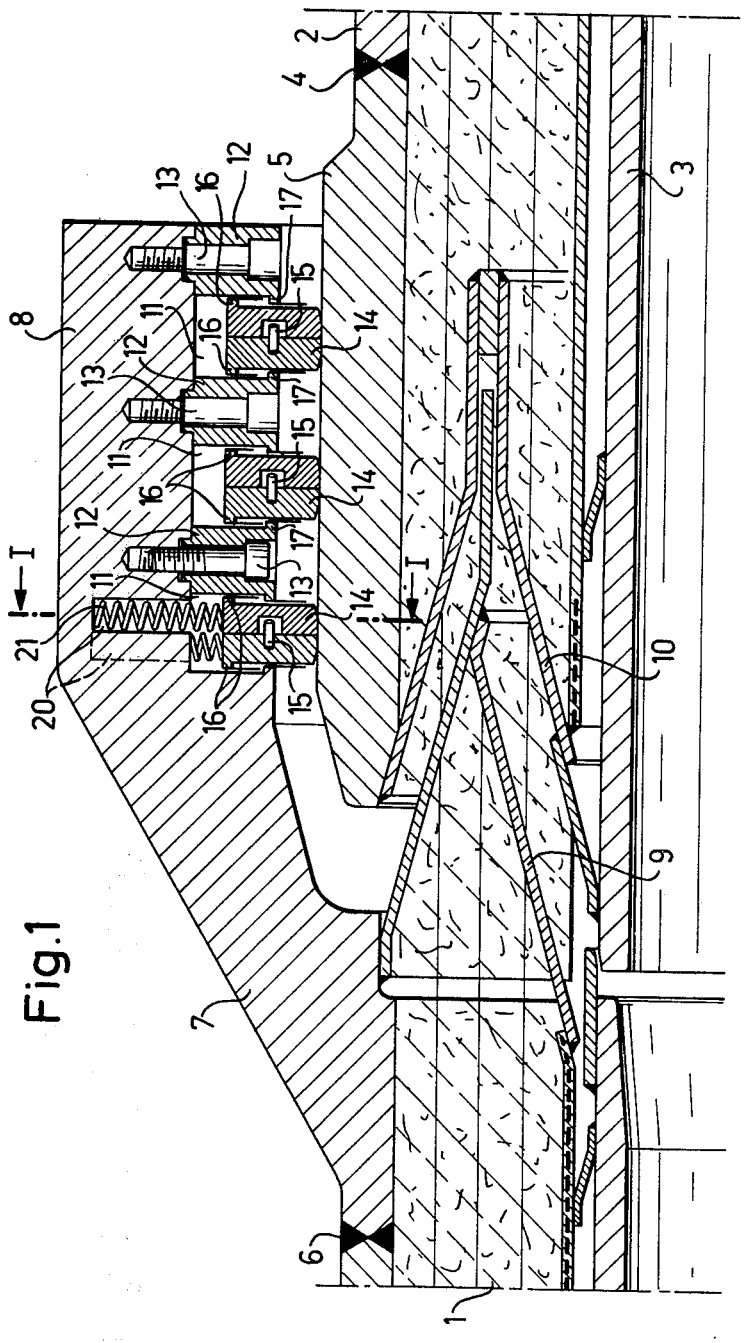
FIG. 1 represents a cross-section through the inner insolated pipeline (partially represented)

FIG. 1 shows a segment of a pipeline which is part of a coaxial gas conduit and accordingly forms the inner conduit part of this gas conduit. the coaxial gas conduit can be disadvantageous, for example, in the reinforced pressure vessel of a gas-cooled high temperature reactor. The pipeline contains an inner isolation 1 which is bordered on the outer side by a pressure housing 2 and on the inner side by a gas conduit housing 3. On the other side of the conduit joint position is a pressure housing 2 joined through a welded seam 4 with a sliding bushing-like member 5. The overlying portion of the pressure housing 2 is joined through a welded seam with a sleeve-like extension 7 which is constructed in an area thereof as a sealing ring holder 8. The cushioning element is provided in the inner insolation 1 of which parts 9 and 10 are joined to the pressure housing 2 as well as to the gas conduit housing 3 wherein a relative movement between the two is possible in an axial direction. These cushioning elements serve to absorb the contraction energies and the reaction energies of the conduit.

The sealing ring holder 8 displays on its inner circumference three circular grooves 11 which are defined through the construction by means of screws 13 of a fastened gasket 12. In each of the grooves 11 are positioned two sealing rings 14 which are combined with one another as indicated by means of a type of pin. This construction allows for the sealing rings to be able to move against one another in a radial direction according to known values. The sealing rings 14 contain on the outer edge of their end surface a circular-like projection 16 and these projections function with corresponding reconstructed projections 17 at the end surface of the gasket 12 in such a manner that the sealing rings 14 cannot become displaced from the circular grooves 11.

Figure 2:
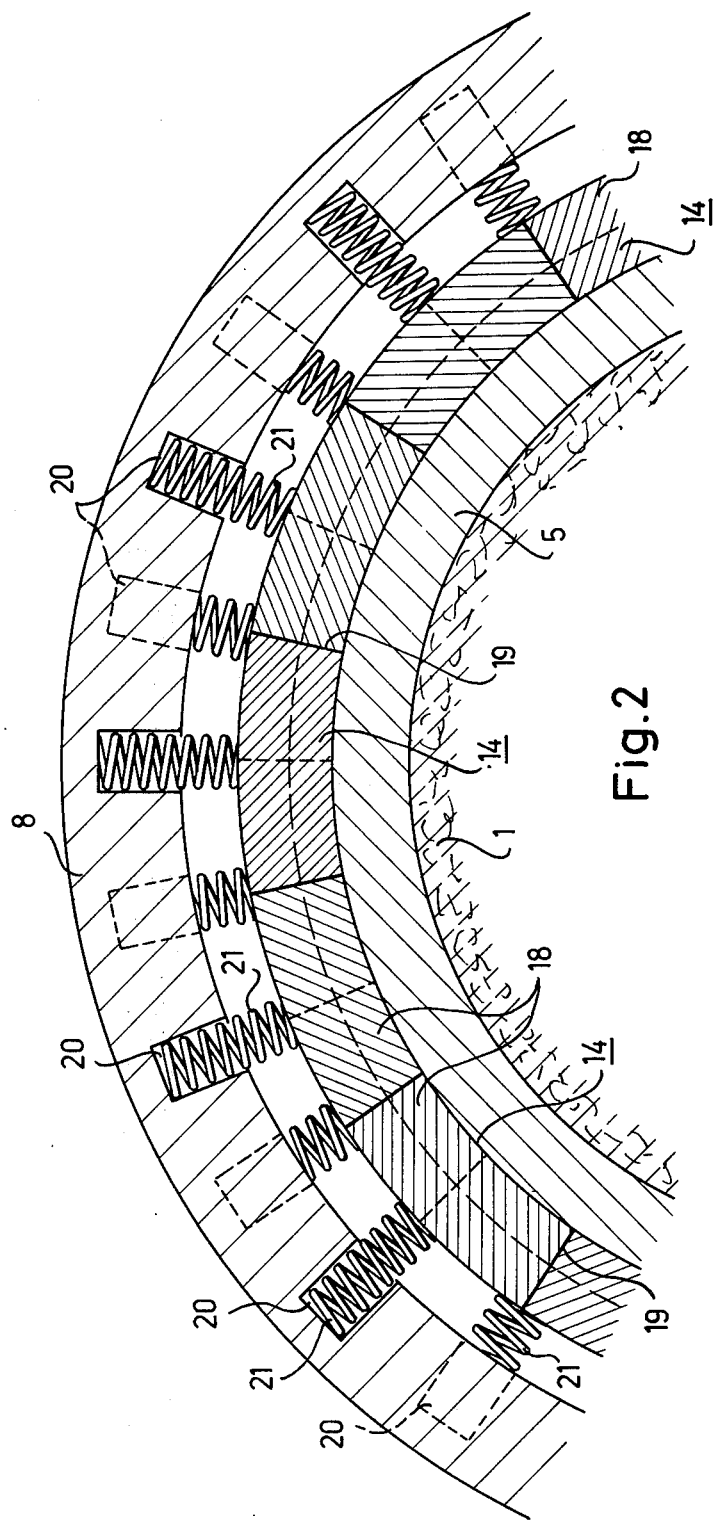
FIG. 2 represents a cross-section through the line I—I of FIG. 1.

As displayed in FIG. 2, the sealing rings 14 are subdivided in a number of segments 18. The individual segments 18 are arranged in such manner in the groove 11 so that the junctions 19 of the segments of the various sealing rings are placed against one another. In this manner, a safe sealing is provided for. The connection of the segments 18 positioned next to one another in groove 11 by means of pin 15 is shown in FIG. 1 and in FIG. 2 omitted for the sake of clarity. In the sealing ring holder 8, several separated radially extending, sunken borings 20 are provided in the area about the circumference of each circular groove. The number of these borings correspond to the number of segments of the novel sealing rings segments 18, positioned in the grooves. The sunken borings 20 are arranged in each case adjacent to a segment 18. In each sunken boring 20 coil springs 21 are found which stand under the initial stress and press their corresponding segment radially toward the inner side. By the functioning of the several coil springs 21, all sealing rings 14 are pressed against the sliding bushing-like member 5 wherein a full sealing of the pipeline to the flowing medium from the outside is achieved. Because both of the pipeline members are to be used only against one another in the arrangement, a simple manipulation of the pipeline connections are provided for.

What is claimed is:

1. A joint for high temperature and high pressure conduits comprising:

a first hollow ring holding member comprising a pressure housing extending from a first conduit member and surrounding a second hollow bushing like member comprising a gas conduit housing extending from a second conduit member and defining a space between said first and second hollow members;

at least one annular groove in said first hollow member opening toward said space;

at least one ring disposed in each groove and extending into said space in sealing relationship to said first and second hollow members, said ring including a plurality of segments separate from and contiguous with each other;

a plurality of separate helical springs disposed radially from said annular groove in said first hollow member coupled with each ring and biasing each ring segment radially inward in sealing relationship to said second hollow member; whereby said segmented rings compensate for axial and radial motion of said members due to temperature variations therein.

2. The joint of claim 1 wherein each of said springs is disposed in a separate boring and couples with one ring segment.

3. The joint of claim 1 wherein at least two rings are disposed in said groove and each of said springs couples directly with the ring segments of only one of said rings.

4. The joint of claim 3 wherein the ring segments from the adjacent rings in said groove are movably connected by a pin in each ring segment extending into a corresponding space in each segment of the adjacent ring whereby the dimensions of said space limit the relative movement of the segments of said adjacent rings.

5. The joint of claim 1 wherein means for cushioning axial and radial movement in said joint is disposed between said pressure housing and said gas housing.

* * * * *